United States Patent [19]

Hendrickson

[11] Patent Number: 5,249,829
[45] Date of Patent: Oct. 5, 1993

[54] PIPE COUPLING GASKET INSERT

[75] Inventor: Thomas R. Hendrickson, Orion, Mich.

[73] Assignee: Quikcoup, Inc., Houghton, Mich.

[21] Appl. No.: 908,339

[22] Filed: Jul. 6, 1992

[51] Int. Cl.⁵ .......................................... F16L 17/035
[52] U.S. Cl. .................................. 285/112; 285/373; 285/910
[58] Field of Search .............. 285/112, 373, 910, 111, 285/419

[56] References Cited

U.S. PATENT DOCUMENTS

| | | | |
|---|---|---|---|
| 2,295,510 | 8/1942 | Ball et al. | 285/112 X |
| 2,449,795 | 9/1948 | Stillwagon | 285/373 X |
| 2,486,451 | 11/1949 | Warren | 285/379 X |
| 3,291,506 | 12/1966 | Blakeley | 285/373 X |
| 3,351,352 | 11/1967 | Blakeley et al. | 285/373 X |
| 3,454,287 | 7/1969 | Thiessen | 285/112 X |
| 3,834,744 | 10/1974 | Masatchi | 285/373 |
| 4,643,461 | 2/1987 | Thau, Jr. et al. | 285/373 X |
| 4,717,179 | 1/1988 | Haberstock et al. | 285/112 |
| 4,872,712 | 10/1989 | Maier | 285/910 X |

FOREIGN PATENT DOCUMENTS 453908 12/1927 Fed. Rep. of Germany ...... 285/112
566329 12/1944 United Kingdom ............... 285/910

*Primary Examiner*—Randolph A. Reese
*Assistant Examiner*—Heather Chun
*Attorney, Agent, or Firm*—Harness, Dickey & Pierce

[57] ABSTRACT

A pipe coupling gasket insert is provided for optional use within a conventional C-shaped in cross-section, resilient gasket which is fitted within a conventional rigid C-shaped in cross-section coupling formed for encircling and coupling together the end portions of a pair of co-axially arranged, adjacent pipe end portions. The gasket has band-like lips formed on its inner portions for encircling and engaging the surfaces of the respective pipe end portions with the lips having free edges that are spaced apart. The pipe ends are slightly gaped apart. The insert, form of a resilient ring, is manually positioned within the gasket, for engaging the base of the C-shaped gasket, and has a radially inwardly extending rim that extends between the free edges of the gasket lips for engaging the end portions of the adjacent pipes and spanning the gap therebetween. The insert rim portion may be shaped to extend into gap or over the gap for sealing the gap between the adjacent pipe ends.

14 Claims, 2 Drawing Sheets

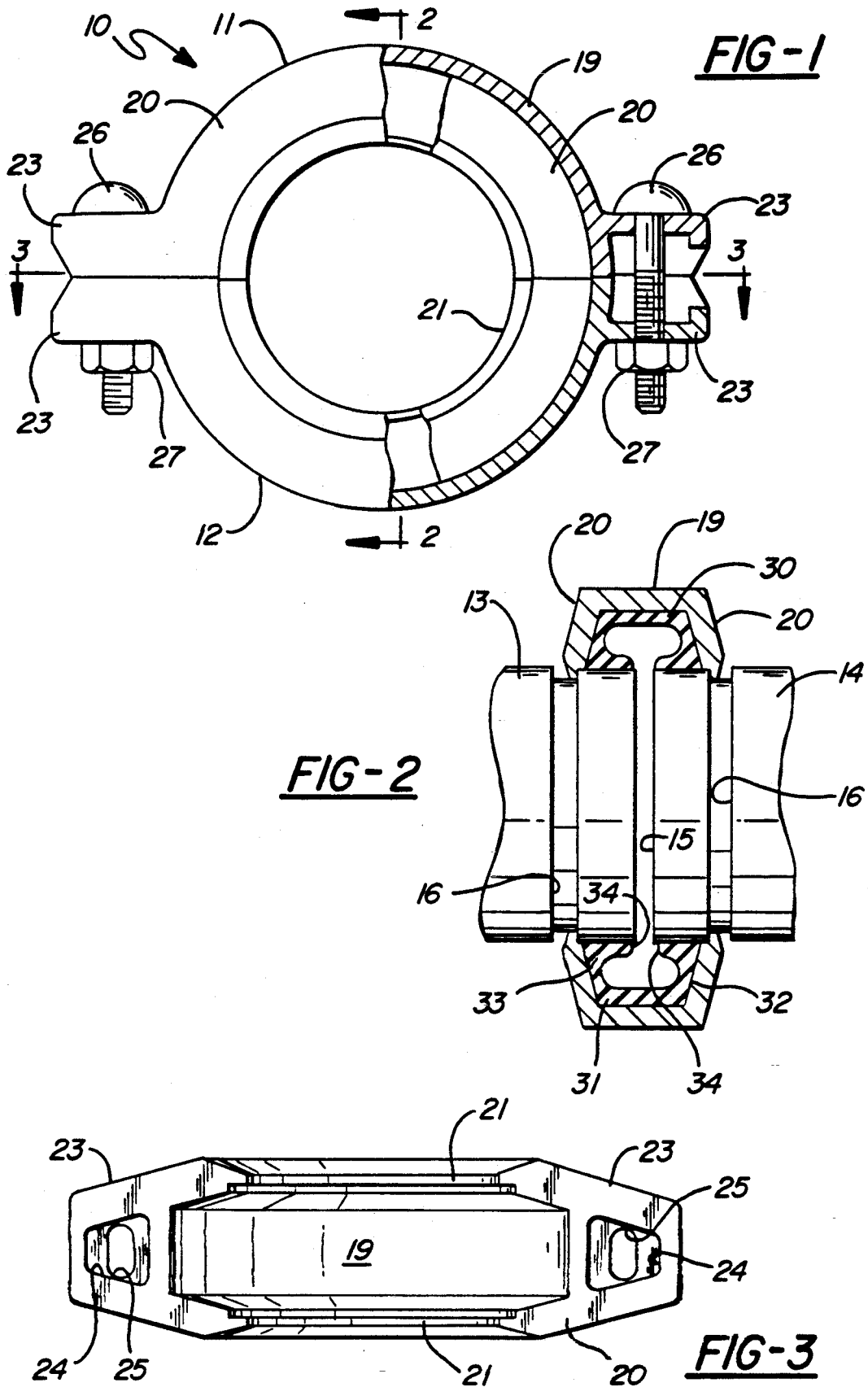

PIPE COUPLING GASKET INSERT

BACKGROUND OF THE INVENTION

This invention relates to a ring-like, resilient insert which may be optionally used within a conventional pipe coupling gasket mounted within a conventional pipe coupling for connecting adjacent ends of aligned pipes.

Conventional pipe couplings which are used to connect the ends of water pipes and the like, which pipes are provided with exterior connection grooves, generally are formed of a circular casing or housing made of two semi-circular segments that are connected together to encircle the adjacent pipe ends. The segments are U-shaped in cross-section with a circular base and inwardly extending legs having free ends that engage within the pipe grooves. Thus, the inner edges of the legs form keys or tenons, which extend within the grooves in the exterior surfaces of the pipes for positively holding the pipe ends together.

A conventional rubber-like resilient gasket is arranged around the adjacent pipe ends and within the coupling casing or housing. That is, the two segments that typically form the casing are positioned around the gasket with their legs enclosing the gasket. The gasket typically is formed with lips on the inner ends of the legs for encircling and engaging the adjacent pipe peripheral surfaces.

Examples of such couplings are illustrated in my prior U.S. Pat. No. 4,966,395, issued Oct. 30, 1991 for a "Rigid or Flexible Coupling for Pipes" and in U.S. Pat. No. 4,915,418, issued Apr. 10, 1990 to Josef Palatchy for a "Hinged Pipe Coupling". Other patents illustrate similar types of devices within which the insert of this invention is useful. As indicated in the above mentioned patents, the coupling segments, which are made out of metal, may be bolted together to form the single, circular coupling or may be attached together by suitable hinge configurations and locked together with bolts, etc.

When conventional casings are utilized to connect water pipes and similar fluid carrying pipes, it is sometimes necessary to seal the adjacent pipe ends more firmly than is possible using conventional gaskets. In addition, it may be desirable to seal the pipe ends together with a seal which is of a different resiliency than the gaskets typically used. This may be particularly useful in installations where the pipe ends tend to move or flex relative to each other.

Thus, attempts have been made in the past to provide C-cross-section shaped resilient gaskets that are utilized within conventional pipe coupling housings, with a central tongue portion, which can extend within or bridge over the slight gap that normally occurs between two aligned pipes that are to be coupled together. An example of this is a coupling gasket formed in a C-shaped cross-section with a central tongue extending inwardly between the spaced apart legs of the gasket. This forms a unitary or integral molded gasket with a central tongue for engaging the adjacent pipe ends. With such construction, rigidifying the tongue sufficiently so that it maintains its position and pressure against the pipes has been accomplished by molding a flat ring within the tongue. The flat ring extends in the axial direction from one side or face of the tongue to the other face.

The formation of an integral gasket and tongue, particularly with a flat ring molded within the tongue for rigidity or stability purposes, is relatively expensive. In addition, that construction requires maintaining a relatively large inventory so that gaskets with and without tongues are available in a number of sizes to fit different couplings. That is, the warehouse or manufacturer or the contractor, utilizing such gaskets, must stock double the number of ordinary gaskets that might be kept, because the tongue is needed in some coupling installations, but not in others. That substantially increases inventory expense and, also, the expense of manufacturing because of the need for additional molds for molding the rubber-like gaskets and the need for different size metal reinforcing rings for the tongues.

Thus, this invention is concerned with providing a tongue-like insert which may be optionally used. This insert may be manually inserted or removed from a conventional coupling gasket when desired.

SUMMARY OF THE INVENTION

This invention relates to the provision of a separate tongue-like insert for application within a conventional C-shaped coupling gasket used within conventional pipe couplings for providing an additional seal against the adjacent edges and peripheral edge portions of pipes to be coupled together. The insert may be used whenever desired by manually placing an insert within the gasket.

The insert may be formed by extruding long lengths or strips which are cut to pre-determined sizes which are bent into ring shapes. Adjacent portions of the bent ring shapes are adhered together by a conventional adhesive or by heat welding the adjacent ends together. Metal reinforcing rings are formed by extruding the rubber-like plastic material around a wire when the long lengths are extruded.

One object of this invention is to form ring-like inserts that provide a tongue within a conventional pipe coupling gasket, which inserts may be manufactured with a single extrusion mold for each cross-sectional size, as contrasted with the numerous molding dies that were required for each cross-sectional size, different diameters, and integral tongue gaskets. Similarly, special fixtures for forming separate metal rings of different diameters for use in reinforcing and stabilizing the tongue of different size coupling are eliminated.

Another object of this invention is to provide inexpensive inserts which may be stocked or inventoried along with conventional gaskets and utilized by the contractor whenever a gasket tongue needed simply by inserting the proper size insert within the pipe coupling gaskets as needed on the job of installing pipes within a building. The insert may be pre-bent into a ring or may be bent in a ring at the job site.

A further object of this invention is to provide an inexpensive, extruded insert which is reinforced with an internal wire, whose ends need not be fastened together. Rather, the extrusion may be bent into a ring and its opposite ends may be adhesively secured together or secured together by heat welding. The wire ends may be unconnected.

An important object of this invention is to provide an inexpensive, optionally useable, gasket tongue for sealing against the adjacent ends of pipes to be coupled, where desired, without the necessity of manufacturing duplicate size gaskets with and without such tongues.

These and other objects and advantages of this invention will become apparent, upon reading the following description, of which the attached drawings form a part.

DESCRIPTION OF DRAWINGS

FIG. 1 is an elevational view, partially in cross-section, showing a conventional pipe coupling for connecting adjacent pipe ends.

FIG. 2 is a cross-sectional view taken on arrows 2—2 of FIG. 1 showing the coupling fastening adjacent, pipe ends together with a typical gasket arranged within the coupling and sealing against the peripheral surfaces of the pipe ends.

FIG. 3 is a view of a single coupling segment, taken in the direction of arrows 3—3 of FIG. 1.

DETAILED DESCRIPTION OF THE PREFERRED EMBODIMENT

Figure 4:
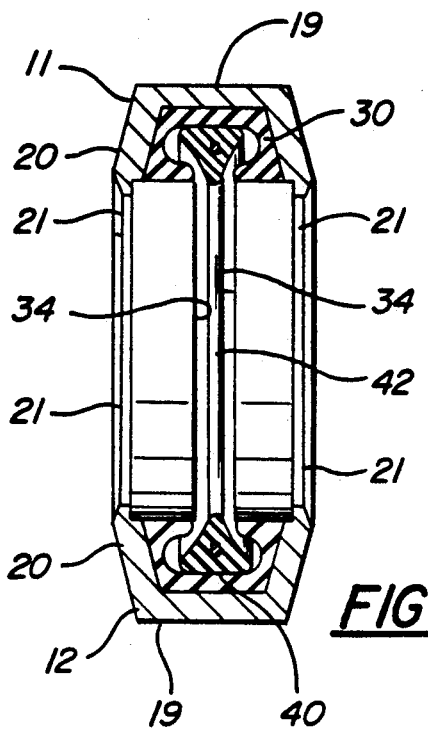
FIG. 4 is a cross-sectional view, similar to FIG. 2, showing the coupling and gasket and the insert positioned within the gasket.

FIG. 1 illustrates, in partial cross-section, a conventional circular pipe coupling formed of a circular casing or housing 10 which is channel shaped or C-shaped in cross-section. The casing may be formed of two semicircular segments 11 and 12, or in some instance, of more than two segments. The casing is arranged around a pair of aligned pipe ends 13 and 14 which are spaced apart by a narrow gap 15. The gap is needed to permit expansion and contraction of the pipes due to normal temperature changes. Each of the pipes is provided with a continuous groove 16 adjacent its respective end.

Figure 5:
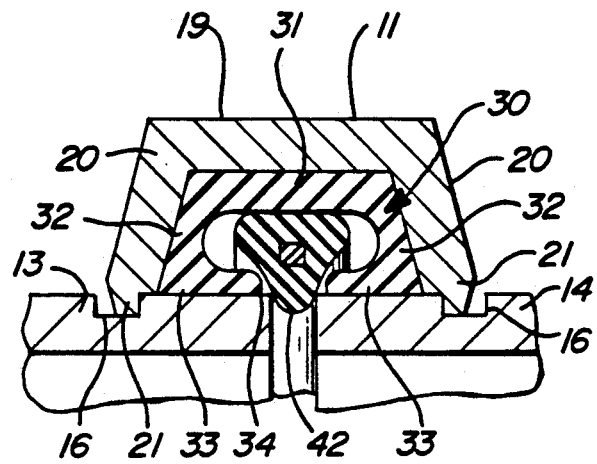
FIG. 5 is an enlarged, fragmentary view of the insert, gasket and coupling engaging and securing adjacent pipe ends together.

The U-shaped casing or housing 10 is provided with an annular base 19 which is spaced apart from and encircles the pipes. Integral legs 20 extend radially inwardly of the base. Each of the legs terminate in an annular, continuous, end which is narrowed to form continuous keys or tenons 21 that fit into the grooves 16 formed in the pipes. This is illustrated, for example, in FIG. 5. These keys or tenons positively hold the pipes together.

The segments 11 may be secured together by bolts. For that purpose, they are each provided with radially outwardly extending hollow lugs 23 which provide sockets 24. Bolt holes 25 are formed in the lugs for receiving fastening bolts 26. The bolts are fastened in place by suitable nuts 27.

Although the drawings illustrate the use of lugs on opposite sides of each of the segments, it is anticipated that the segments may be hingedly connected together on one side and bolted together on the opposite side, such as illustrated in the above-mentioned U.S. Pat. No. 4,915,418.

A ring-shaped gasket 30 is inserted within the casing 10. The gasket is made of a resilient, rubber-like material which is conventionally molded into a C-shaped cross-section. The gasket is sized to closely fit within the casing 10 so that its base portion 31 is adjacent the annular base 19 of the casing and its legs 32 are adjacent the legs 20 of the casing.

The gasket legs are preferable formed with oppositely extending lips 33 having free ends 34 that are spaced apart a short distance. These lips from narrow bands which encircle and engage the peripheral surfaces of the respective pipes for sealing against them. In use, where the pipes carry a liquid, such as water, the liquid in the pipes may flow through the gaps to the gaskets and force the lips into tighter, sealing engagement with the respective pipe surfaces that they engage.

The foregoing construction of the casing or housing 10, the interior gasket and the sealing formed by the gasket are conventional. This invention relates to a resilient insert 40 which may be optionally used within the gasket 30.

Figure 6:
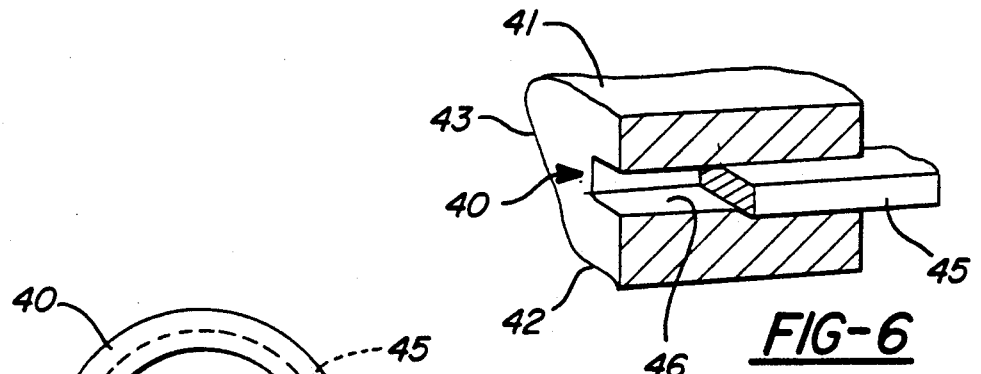
FIG. 6 is an enlarged, cross-sectional, fragmentary, perspective view of a portion of the insert, showing the wire reinforcement within the insert.

The resilient insert is preferably extruded in a generally triangular cross-sectional shape which may have rounded apices. That is, it is formed with a relatively wide base 41, which engages against the interior surface of the gasket base 31, and a narrowed, rim portion 42 which extends between the free ends of the gasket lips 33. Preferably, the side walls defining the insert are provided with annular depressions 43 (see FIG. 6.).

The insert is molded in long strips which are cut to pre-determined lengths which are bent into desired diameters. In the extrusion process, a metal wire is inserted to form a metal ring 45 when the extruded length is bent into a ring. The metal ring, in effect, is arranged within a passageway 46 formed in the insert.

The long extrusions may be formed of a suitable resilient or rubber-like material which may be either the same or a different material that is used for the gasket. By way of example, the insert may be made of a relatively harder or relatively softer resilient material than the gasket material to provide different sealing effects and, also, to enable the adjacent pipe ends to move relative to each other while maintaining their sealed relationship.

Figure 7:
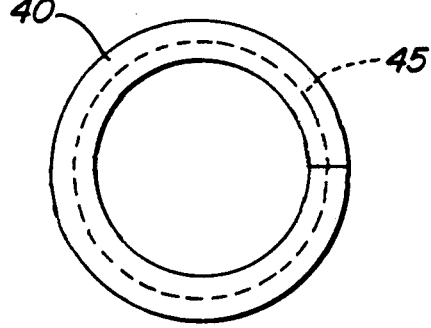
FIG. 7 is a view, to a smaller scale, showing the ring-like insert.

The strips or lengths that are cut from the extrusion may be bent into a ring either at the manufacturing site or at the job site. The adjacent ends of the lengths are adhesively secured together at 47 as illustrated in FIG. 7. Ordinarily, it is not necessary to secure the adjacent ends of the wire 45 together. The adjacent wire ends could be welded to form unitary rings, but for most uses, the forces involved do not require a unitary ring. The wire ring, which is embedded within the rubber-like ring, functions to maintain the shape and stability of the insert even if the wire ends are not secured together. Preferably, the wire is formed in a square cross-sectional shape which is completely embedded within the insert to prevent any contact with liquid flowing within the gasket.

The ring-like insert may be cavity molded in a conventional plastic molding machine. However, that requires a separate mold for each diameter ring. Thus, the extrusion method described above is preferred since only a limited number of different cross-sectional size inserts are required for fitting within a much larger number of different diameter gaskets. That is, the same cross-sectional size and shape insert may be formed in larger or smaller rings to fit within different diameter gaskets. That limits the number of extrusion dies that are needed. For example, one, two or three extrusion dies may be sufficient to cover a large number of different gasket sizes.

The depressions 43 enable the insert ring to be compressed by pressurized liquid located within the interior of the gasket. This stiffens and holds the insert tongue-lie configuration centered within the gasket and properly positioned for sealing against the pipes. While the depressions may be omitted, preferably the depressions are used for this positioning and stabilizing effect for improving the sealing.

In operation, the installer of the pipe system within a building may carry with him couplings of the correct size for the particular diameter of pipes to be installed. Those couplings normally are sold with the correct size gaskets. The installer may also carry a collection of loose insert rings for use where needed. When it is desired to use such an insert for sealing adjacent ends of pipes at their gaps, the installer manually places an insert ring of the required diameter and cross-sectional shape within the particular gasket used for that coupling joint. Then the gasket, with the insert, is slipped over the end of one pipe. Next, the other pipe is slipped into the gasket and insert. After that, the metal coupling is applied around the outside of the gasket and bolted in place. That couples the two pipe ends together. The gasket seals against the peripheral surfaces of each of the adjacent pipe ends and the insert seals against the adjacent pipe ends at the gap (see FIG. 5).

Since the insert rings are relatively small in size, compared to the gaskets, and since they are inexpensive, the installer may carry an assortment of such rings for use with any particular coupling.

Figure 8:
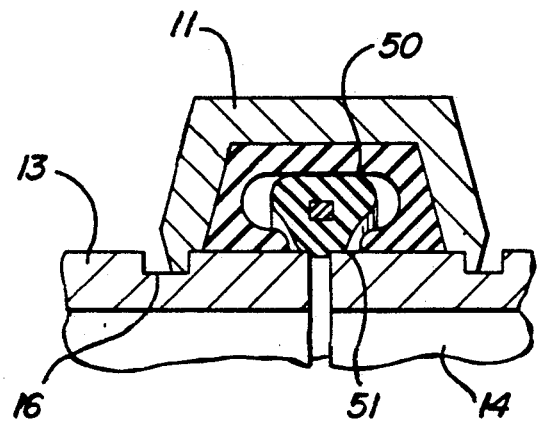
FIG. 8 is a view similar to FIG. 5, but showing an insert having a modified interior sealing rim for bridging the gap between adjacent pipe ends.

For some couplings, it is desired to utilize an insert which bridges the gap between adjacent pipes, rather than fitting between the pipe ends. For that purpose, as illustrated in FIG. 8, a modified insert 50 may be used. This is essentially the same in construction as the insert 40, except that its inner rim 51 is flatter and wider than the rim 42 on the insert 40. The wider rim 51 spans over the gap and encircles, without necessarily fitting between the pipe ends. Otherwise, the operation and usage of the modified insert is the same as the insert 40 previously described.

This invention may be further developed within the scope of the following claims.

Having fully described an operative embodiment of this invention, I now claim:

1. In a pipe coupling for coupling together the adjacent ends of a pair of axially aligned pipes whose adjacent ends are slightly spaced apart to form a gap therebetween, with the pipe coupling formed of a substantially circular casing which is C-shaped in cross-section to provide a continuous, annular radially inwardly opening channel within the casing, with the channel defined by an annular base and a pair of spaced apart, annular, radially inwardly directed legs whose free annular inner end portions encircle and enclose the adjacent end portions of the aligned pipes; and with an annular, resilient gasket positioned within the casing channel and said gasket being generally channel shaped in cross-section to form an annular base portion arranged adjacent the casing base and inwardly directed leg portions adjacent their respective casing legs and terminating in free edges which are spaced apart, for encircling and sealing against adjacent end portions of the aligned pipes for sealing and coupling the pipes together, said gasket base and legs defining a channel, the improvement comprising:

a rubber-like, resilient, ring-shaped insert loosely fitted within the gasket channel such that at least one gap is formed between said insert and gasket when the joint is in its clamped, functional position, and said insert enabling manual insertion and removal of the insert from the gasket channel for selective use with the gasket;

with the insert having an outer, peripheral base surface arranged against the gasket base, and having an inner, narrowed, continuous annular rim portion extending radially inwardly between the free ends of the gasket legs, depression means on said insert ring between said insert base and rim, said depression means enabling said insert to be compressed by pressurized fluid in said at least one gap within said gasket channel, in a use position; and said rim portion fitting across the gap between the pipe ends and encircling and engaging both of the adjacent pipe ends for resiliently sealing them together.

2. In a pipe coupling as defined in claim 1, and including said gasket leg portions each having an annular, cylindrically-shaped lip which forms a narrow band, encircling and in contact with one of the pipe end portions, with the lips terminating in said free ends which are spaced apart;

with the insert rim portion being narrower than the space between the free ends of the lips for fitting therebetween for engaging the adjacent pipe ends.

3. In a pipe coupling as defined in claim 2, and including a metal ring completely embedded within the insert and extending, in a circumferential direction, within the insert at a location about midway between the insert base and the insert rim portion.

4. In a pipe coupling as defined in claim 3, and with said metal ring being of a cross-section which is substantially equal in length in the radial and the axial directions of the coupling.

5. In a pipe coupling as defined in claim 3, and with said insert being of a generally triangular shape cross-section, that is, with rounded apices, with the insert rim portion being of a size and shape to fit between the adjacent ends of the pair of pipes to be coupled for sealing the end defining surfaces of the ends of the pipes.

6. In a pipe coupling as defined in claim 5 and with each of the side walls defining the insert portions between its base and rim portion being formed with an annular depression.

7. In a pipe coupling as defined in claim 3, with said rim forming portion of said insert ring being shaped to encircle and engage against the exterior peripheral surfaces of the adjacent pair of pipe end portions for encircling the circumferences of each of the pipe end portions and also encircling and spanning the gap therebetween.

8. In a pipe coupling as defined in claim 3, and with said insert being formed of an elongated strip terminating in end faces, with the strip being bent into the ring shape and having its end faces bonded together to form the ring.

9. An insert for a pipe coupling gasket with is formed of a C-shaped in cross-section circular ring made of a resilient, rubber-like material and having a circumferential base with integral, radially inwardly extending legs terminating in edge portions which are spaced apart a short distance and which are sized and shaped to encircle adjacent pipe ends of a pair of pipes that are co-axially arranged for coupling together, and with the gasket contained within a C-shaped, in cross-section coupling housing which encircles the adjacent pipe ends for coupling the pipe ends together said gasket base and legs defining a channel, In said insert comprising:

a resilient, rubber-like, ring which is roughly triangular shaped in cross-section so as to have a base portion adapted to be arranged against the interior of the base portion of the gasket and a radially inwardly extending rim portion, with the insert being adapted for being loosely inserted within the gasket channel such that at least one gap is formed between said insert and gasket when the joint is in its clamped, functional position, and for manually selectively positioning and removing the insert from the gasket;

depression means on said insert ring between said insert base and rim, said depression means enabling said insert to be compressed by pressurized fluid in said at least one gap within said gasket channel, in a use position; and said insert rim being sufficiently narrow, in the axial direction of the gasket, for fitting between the free ends of the gasket legs for engaging against both of the adjacent end portions of the adjacent pipes for sealing against said pipe end portions.

10. An insert for a pipe coupling gasket as defined in claim 9, and including a metal ring completely embedded within the insert and extending in a circumferential direction, within the insert, at a location which is approximately midway between the base of the insert and its inner rim defining portion.

11. An insert for a pipe coupling gasket as defined in claim 10, and including said ring having a cross-sectional shape wherein the width of the ring and the radial height of the ring are approximately the same in dimension.

12. An insert for a pipe coupling gasket as defined in claim 9, with the rim defining portion of the ring-shaped insert being shaped and sized to fit freely between the adjacent ends of the gasket legs and to extend between the adjacent ends of the pipes into a gap between the pipe ends for engaging and sealing against the radially extending faces of the pipe ends.

13. An insert for a pipe coupling gasket as defined in claim 9, and said inner rim portion of the insert being formed of sufficient width in the axially direction of the gasket to encircle and engage against the circumferential surfaces of both of the adjacent pipe end portions and, also, to span and encircle a gap formed between the adjacent pipe ends for sealing the pipe and, peripheral surface portions.

14. An insert for a pipe coupling gasket as defined in claim 9, and with insert being formed of an elongated strip having transverse end faces at its opposite ends, with the strip being bent into a ring-shape and its end faces being bonded together to form the unitary ring.

* * * * *